United States Patent Office.

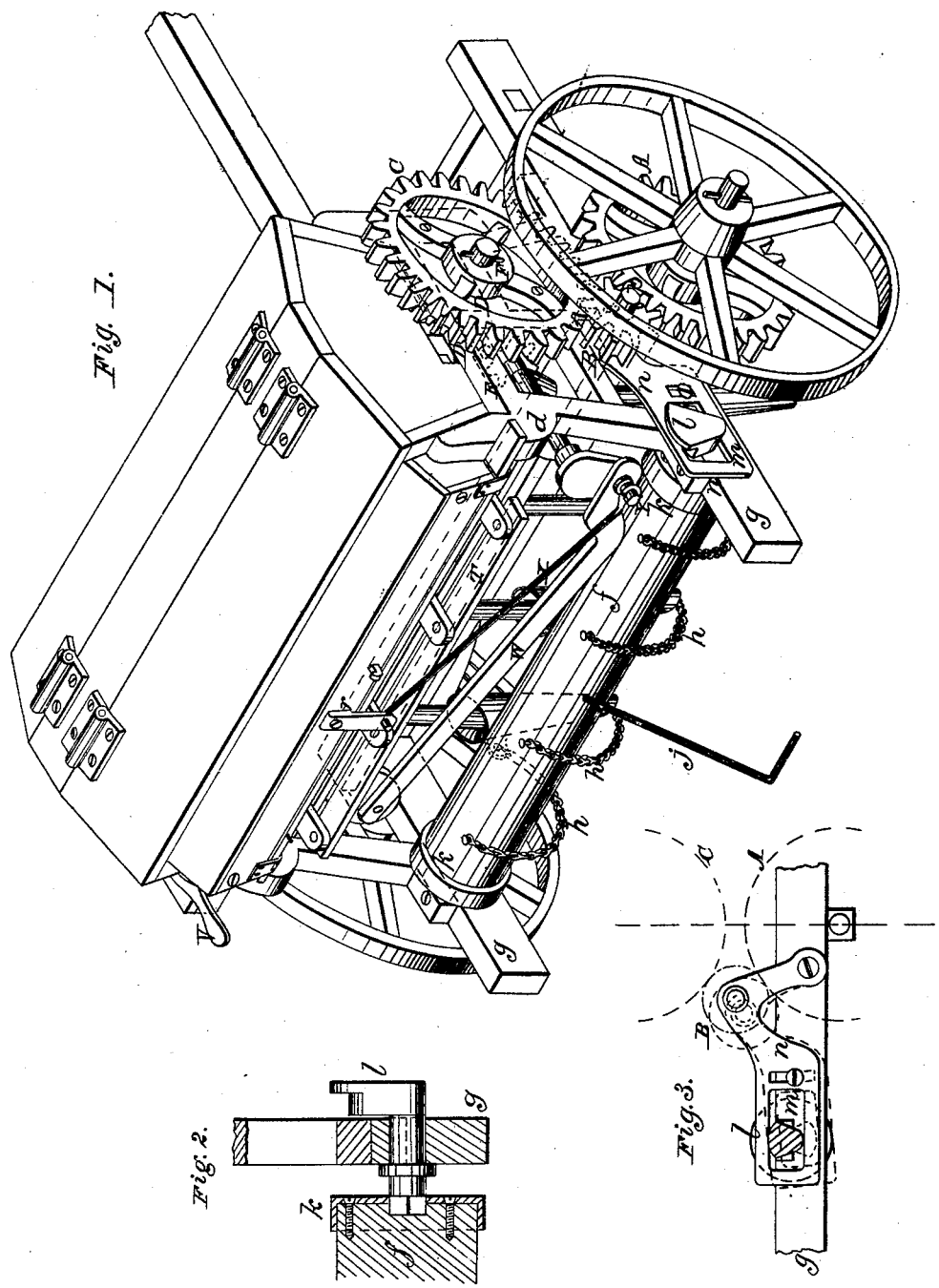

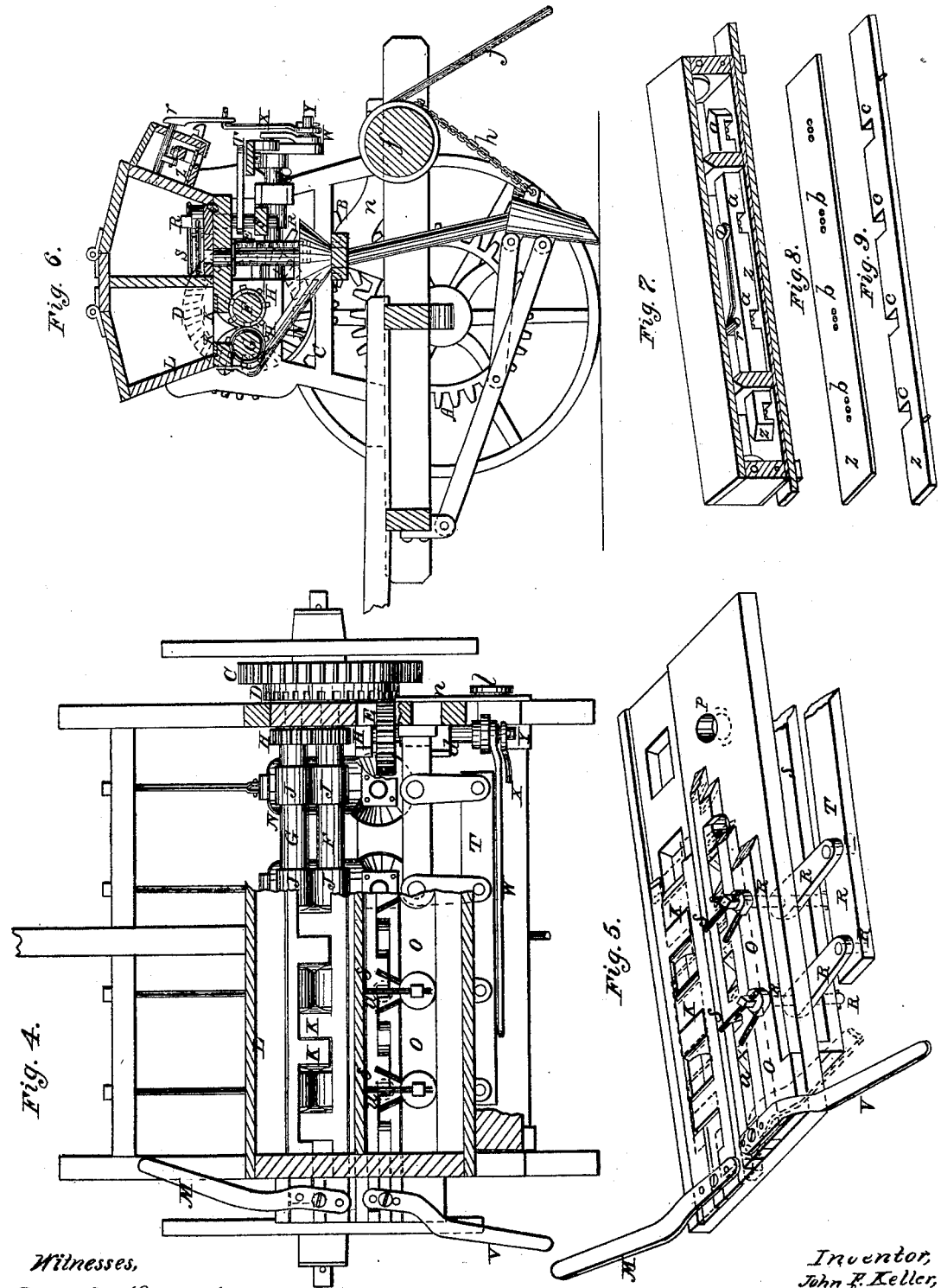

JOHN F. KELLER, OF HAGERSTOWN, MARYLAND, ASSIGNOR TO HAGERSTOWN AGRICULTURAL IMPLEMENT MANUFACTURING COMPANY, OF SAME PLACE.

Letters Patent No. 90,556, dated May 25, 1869.

IMPROVEMENT IN COMBINED SEED-DRILL AND FERTILIZER.

The Schedule referred to in these Letters Patent and making part of the same.

*To all whom it may concern:*

Be it known that I, JOHN F. KELLER, of Hagerstown, county of Washington, and State of Maryland, have invented a new and useful "Grain-Seed Drill and Fertilizer Combined;" and I do hereby declare the following to be an exact description thereof, reference being had to the accompanying drawings, and to the letters of reference marked thereon, making a part of this specification, in which Nos. 1 and 2 exhibit the several figures, to wit:

Figure 1 represents a perspective view of the machine that I style the "Grain-Seed Drill and Fertilizer combined."

Figure 2 exhibits the end of the roller for raising the teeth or hoes, with its cast-iron cap, one at each end of the roller.

Figure 3 represents the eccentric on the end of the roller, operating in the slot of an iron angular arm on the side of the frame, the upper angle of the arm having a solid wrist, that carries the middle cog-wheel.

Figure 4 represents a top view of the grain-sowing and fertilizing devices.

Figure 5 is a top perspective sectional view of the same.

Figure 6 is a sectional elevation of the machine, with its devices combined.

Figures 7, 8, and 9, exhibit the hopper and slides of the seeder for timothy and clover.

The nature of my invention consists in the construction and arrangement of the devices, and combined as follows:

First, the cast-iron bottom, with the solid cranks and shafts, for moving the stirrers for sowing and distributing fertilizers.

Second, also, the slides, with their incline edges, opening from the centre, right and left, as operated by their lever, at the left side of the hopper, for gauging and regulating the quantity of fertilizing-material to be sown.

Third, also, the stationary bar that supports the journals of the lower end of crank-shafts.

Fourth, also, driving the grass-seed sower by means of the crank at the rear of its hopper, as connected with the main driving-cranks of sower.

Fifth, also, the caps on the ends of roller, and the eccentric at the one end, as operating in the slot of the iron arm, that is pivoted to the right side of the frame, and supports the centre cog-wheel.

To enable others skilled in the art to make and use my invention, I will proceed to describe its construction and operation as follows, to wit:

A is the main driving cog-wheel, that is attached to the carriage-axle on the right-hand of the machine, as shown at fig. 1.

It gears into a small centre cog-wheel B, that gears into an upper cog-wheel, C, that has an inside cog-wheel, D, that gears into a small toothed wheel, E, that operates the fertilizing and seeding-devices, whilst the shaft or axle F of the cog-wheel C operates, as shown at figs. 4 and 6, with another axle or roller, G, moved by small toothed wheels H H, and short rubbers J J, as the rollers F and G, to sow the grain, as the grain falls through the graduating-sliders K K, located in the inside of the hopper L, and graduated by means of an adjustable lever, M, on the left side of the machine.

Heretofore, the slides for regulating the feeding and gauging the quantity of grain or seed to be sown, have been placed on the under side of the bottom of the hopper, thereby compelling the use of frames to hold the slides in their place, and the use of extra frames or devices, to prevent lateral discharge; and, further, the use of the slide underneath threw the feed-rollers too far away from the bulk of grain or seed in the hopper, giving difficulty in feeding small quantities of grain. On account of the small aperture required and the distance to the feeders, the grain would bridge over the small opening, thereby producing irregular feeding.

By placing the slide on the inside of the hopper, it needs no under supports, as the bottom of hopper holds it in its proper position, and thereby brings the feed-rollers close to the aperture through which the grain passes, preventing the bridging of the grain, whilst the slides themselves, with the gauge-pieces attached, prevent all lateral discharge of the grain.

My slides open from the centre, right and left, thereby feeding the grain immediately on the centre of the feeders or rollers F and G.

These slides K K have on them the gauge-pieces, which regulate the quantity of grain to be sown, preventing any lateral discharge of the grain, and in opening or closing the slides that make the openings, they are moved to the right and left, by means of the lever M.

These side-pieces of the slides K K incline down to a point, and fill up the space between the rollers, which effectually prevent any lateral discharge.

N is the spout, shown at fig. 6, that carries the grain from the rollers F and G to the same funnel and hose, and discharging it through the same drilling-tooth with the guano when required.

In guano-attachments, some fertilizers, when agitated in sowing, become, after agitation, hard and adhesive, not unlike putty. When being sown, they work into the stirrer-boxes, and oftentimes become so hard, adhering to the stirrer-cranks and shafts, as to be almost immovable, requiring great power to work the machine, and in many cases rendering it necessary to remove the stirrers and cranks, and clean them and the boxes in which they work before they can be again used.

To remedy these defects, and overcome these difficulties, I have put into my machine an iron bottom, O, (see fig. 5,) in which are the boxes P, that the cranks R work in, that move the stirrers S. These boxes P, in the bottom, being shallow and much wider below than at the top, permit the fertilizing-substance, when it works in at the top of boxes, to fall out below.

To prevent great agitation in sowing this class of fertilizers, I have made the stirrers or sowers S, that work over the feed-holes, of a peculiar shape, the head or coupling being made small, and the round stirrers or feeders cast into it. The motion of the machine being slow, there is very little agitation of the fertilizer, because the stirrers pass through the mass of fertilizers in the hopper with ease, therefore reducing the power required to work it, by lessening the size of the stirrers or feeders, and thereby diminishing the resistance of the fertilizer to the stirrers or feeders.

Heretofore, in driving or operating fertilizing-stirrers in the hopper by a reverse motion, some of the motion was lost, on each reverse of the stirrers, by reason of the cranks and stirrer-shafts being in separate pieces, and therefore not working with the precision required. I have remedied this by making the crank R and shaft R solid in one piece, the lower end of which is held in line and place by the bottom-piece s, in which are boxes for the ends of crank R to work in, the cranks working between the bearings in the boxes at so low a point as to allow all the fertilizing-substance that works through the boxes in the bottom, and through the apertures P in the wooden frame, to fall freely from the machine, and through the tubes beneath In slides used for sowing or feeding fertilizers, it is important, that when they are opened partially or full, the opening thus made should at all times be equal each way from the centre, and by the opening being thus equal each way from the centre, the stirrers or feeders used for depositing or working the fertilizers into the opening made, pass in their backward and forward motion an equal distance each way over the opening, and thereby equalize the quantity and resistance of the fertilizer to the stirrers or feeders, which I accomplish completely by my invention.

U are the openings of the slides, as seen at fig. 4, and V is the lever at the side of hopper, by which the openings are regulated to suit the quantity and the character of the fertilizer being sown, the openings being wider below than above, by reason of their bevelled edges.

The lower piece, or bar T, that operates the cranks R, receives its reciprocating motion from the connecting-rod W, by which the stirrers S are moved backward and forward in the hopper, whilst the additional connecting-rod X (attached to the same crank-pin, Y, that operates the connecting-rod W,) serves to operate the slides Z in the seed-hopper, in the rear, as seen at figs. 6, 7, 8, and 9, by means of the crank r.

The upper slide Z is moved backward and forward, with its square openings $a$ passing over the apertures, three round holes, $b$, in the under stationary bottom, and the seed falls down through them and the square openings C of the lower slide Z, that is movable, to regulate the quantity of seed to be sown, and the crank Y, by which the connecting-rods W and X are driven, is located on the end of a short shaft, $d$, that is operated by the pinion or toothed wheel E, as seen at figs. 1, 4, and 6.

$f$ represents the horizontal roller, extending between the ends of the frame $g$ and its journals, partially revolving in the frame $g$, for the purpose of raising and lowering the drills, by means of the chains $h$ and centre lever $j$, as shown at figs. 1 and 6.

On the ends of roller $f$ are round cast-iron caps $k$, (see fig. 2,) to strengthen the journals of the roller.

The journal, at the right side, extends beyond the frame $g$, as a shaft, with an eccentric, $l$, on the outer end, that operates in a slot, $m$, of the flat iron arm or shank $n$, pivoted to the frame $g$, and having a wrist or pin, $p$, that supports and carries the middle toothed wheel B, by which the machine is geared and ungeared as the arm $n$ is moved forward or drawn back by the eccentric $l$, as shown at figs. 1 and 3.

At fig. 5, a stationary cross-bar, $s$, is shown, that is permanently attached at each end to the frame-work of the machine. To this cross-bar, the lower ends of the crank-shafts R are permanently secured, by a pin underneath the bar, so that the cranks are kept in perfect line by the bar $s$ supporting their solid shaft-ends R in a true vertical position, making the machine to work accurately, without getting out of order.

What I claim as my invention, and desire to secure by Letters Patent of the United States, is—

1. The cranks and shafts R R, when constructed solid, as herein described, and for the purposes set forth.

2. Also, the stationary bar $s$, when constructed as a support and bearing for the solid crank-shafts R to keep the shafts in line and preserve their vertical position, as herein described.

3. Also, the slides K K, when constructed so as to open from the centre, to gauge the quantity of grain, and having their side-pieces at the openings inclining down to a point between the rollers F and G, for the purpose of preventing any lateral discharge of the grain, as herein described.

JOHN F. KELLER.

Witnesses:
J. FRANKLIN REIGART,
EDM. F. BROWN.